SEQUENTIAL SCAN SYSTEM HAVING PARALLEL TO SERIAL CONVERSION

Filed Aug. 19, 1960 3 Sheets-Sheet 1

INVENTORS
Arthur W. Holt
James D. Hill
Henry Hironaka

BY Joseph A. Genovese
ATTORNEY

SEQUENTIAL SCAN SYSTEM HAVING PARALLEL TO SERIAL CONVERSION

Filed Aug. 19, 1960 3 Sheets-Sheet 2

INVENTORS
Arthur W. Holt
James D. Hill
Henry Hironaka
BY Joseph A. Genovese
ATTORNEY

SEQUENTIAL SCAN SYSTEM HAVING PARALLEL TO SERIAL CONVERSION

Filed Aug. 19, 1960 3 Sheets-Sheet 3

INVENTORS
Arthur W. Holt
James D. Hill
Henry Hironaka
BY Joseph A. Genovese
ATTORNEY 3,164,805
Patented Jan. 5, 1965

3,164,805

SEQUENTIAL SCAN SYSTEM HAVING PARALLEL TO SERIAL CONVERSION

Arthur W. Holt, Silver Spring, Md., James D. Hill, Washington, D.C., and Henry Hironaka, Bethesda, Md., assignors, by mesne assignments, to Control Data Corporation, Minneapolis, Minn., a corporation of Minnesota Filed Aug. 19, 1960, Ser. No. 50,738
9 Claims. (Cl. 340—146.3)

Figures 1, 1A, 1B, 1C, 1D:
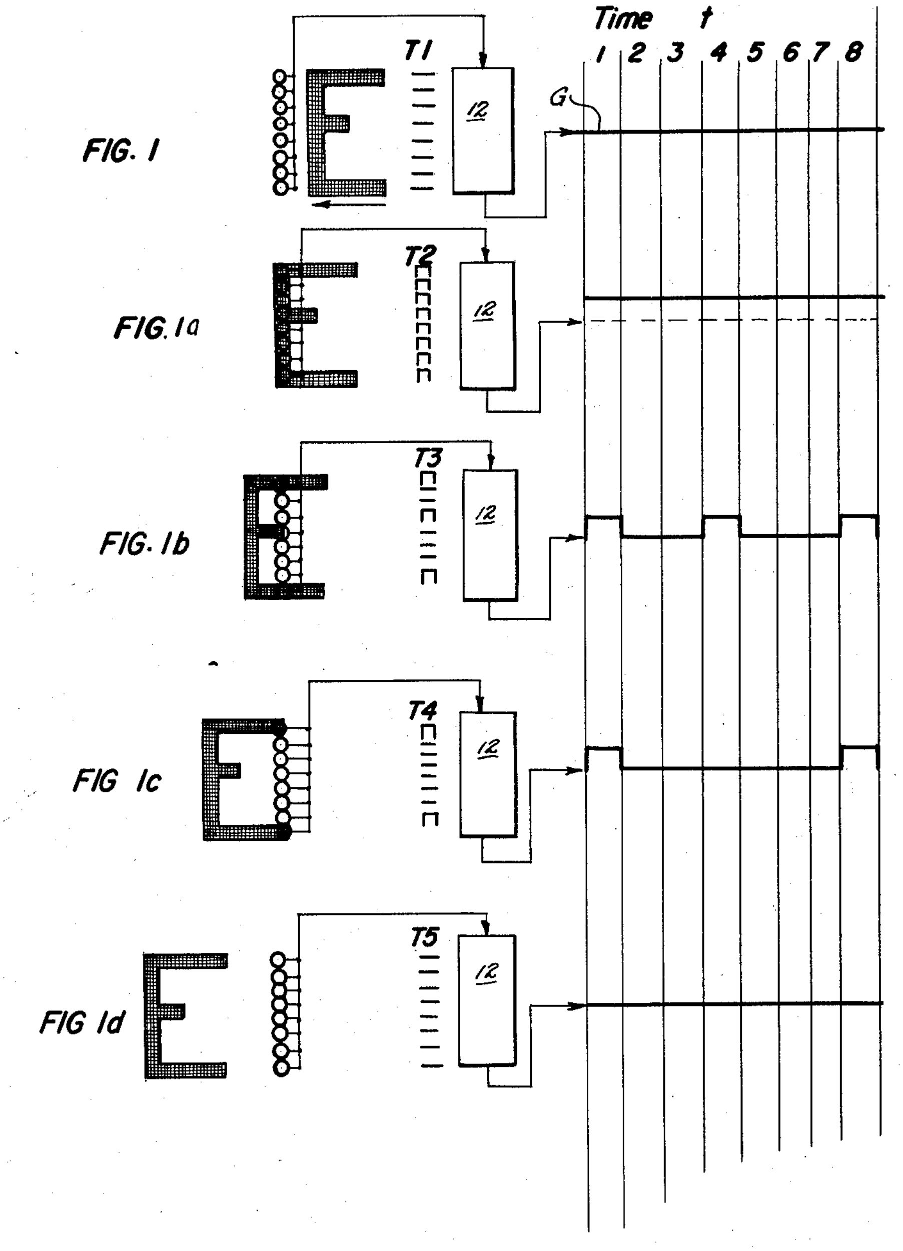

This invention relates to scan systems and more particularly to sequential scan systems having parallel to serial conversion, making them especially useful in reading machines.

The technique of parallel-to-serial, and serial-to-parallel conversion is well known in the computer art, as exemplified by the T. Kilburn Patent No. 2,940,670. Reading machines using parallel-to-serial conversion are also known, for instance as disclosed in the M. H. Glauberman Patent No. 2,932,006. Our invention deals with the latter class of subject matter.

An object of this invention is to provide a unique parallel to serial converter which receives scan information in parallel and converts it into a scan output signal serially modulated with the scan information, enabling the memory and recognition circuits of a reading machine to process the information more easily.

It is believed that the disclosure in the Glauberman patent is pertinent prior art because Glauberman discloses a row of photocells used as the scanner for a moving character, gates fed by the photocells, and a delay line connected with the gates. This arrangement bears a superficial resemblance to our invention in that we have elected to disclose a row of photocells as the scanner, gates, and a delay line in the illustrated embodiments of our invention. Glauberman employs a trigger pulse on the delay line so that the multiple tap outputs of the delay line sequentially interrogate the gates, and the outputs of the gates are used as scan information in serial form. As explained below, we do not do this, our system being faster by taking advantage of very fast gates that are interrogated simultaneously.

Our invention has the photocells of a row arranged to feed a group of gates, and the outputs of the gates are applied to the multiple taps of a delay line or a digital memory device. However, the gates are interrogated simultaneously (not sequentially as in Patent No. 3,932,006), for instance by the signal of a strobe pulse generator. The effects is that the strobe pulses not only interrogate the gates simultaneously, but also function as scan triggers. We are able to increase or decrease the number of scans per character merely by adjusting the strobe pulse generator frequency, in relation to the speed of the character area moving past the scanner or vice versa. The memory device provides a serial output modulated with information in accordance with those gates which are satisfied and those which are not satisfied at the time of applying an interrogation pulse to the entire group of gates.

Another object of the invention is to provide a sequential scan system using a memory device in the novel way described above, so that the scan information is made available as sharp pulses with minimal equipment.

A further object is to provide a scan system having parallel to serial conversion as discussed above, and to use an interrogation signal in such a manner that it functions directly or indirectly as a scan trigger.

A feature of our invention is the coincidence devices or gates. The advantages over all previous gates of which we are aware, are discussed subsequently.

Other objects and features of importance will become apparent in following the description of the illustrated forms of the invention.

FIGURE 1 is a diagrammatic view showing a typical scanner for characters and the scan output signal together with the converted signal obtained when the scanner and a character are in the relative position shown.

FIGURES 1*a*–1*d* are diagrammatic views similar to FIGURE 1 but showing the scan output signals and converted signals when the scanner and character are in successive relative positions.

Figures 2, 3:
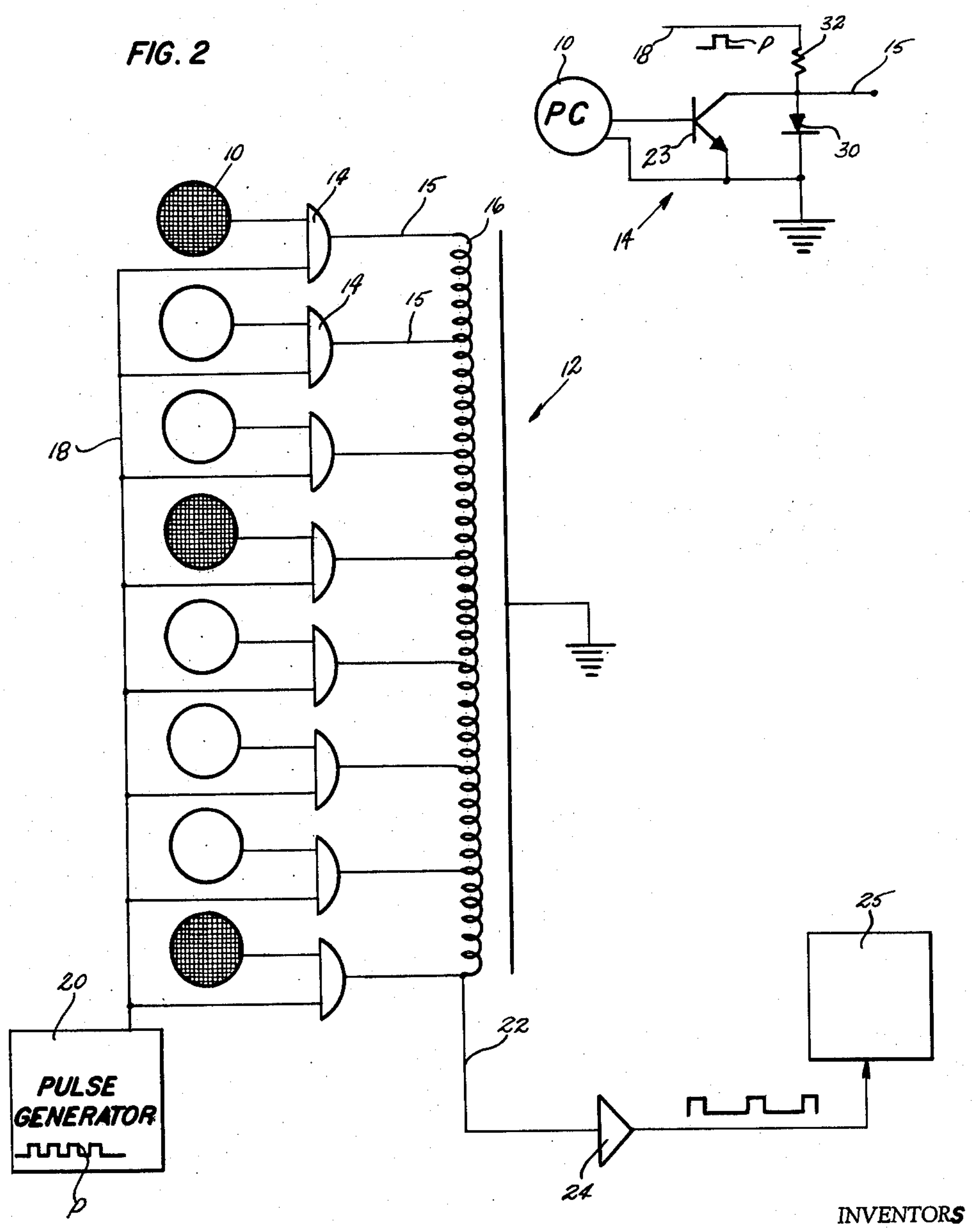

FIGURE 2 is a diagrammatic view showing a system embodying the invention.

Figure 2A:
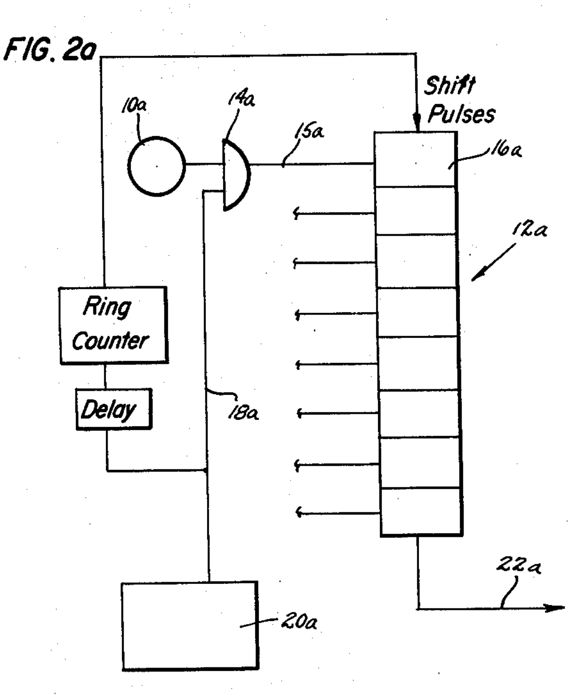

FIGURE 2*a* is a fragmentary view showing a modification where a shift register is the memory device.

FIGURE 3 is a schematic view showing the circuit of one of the gates.

Figure 3A:
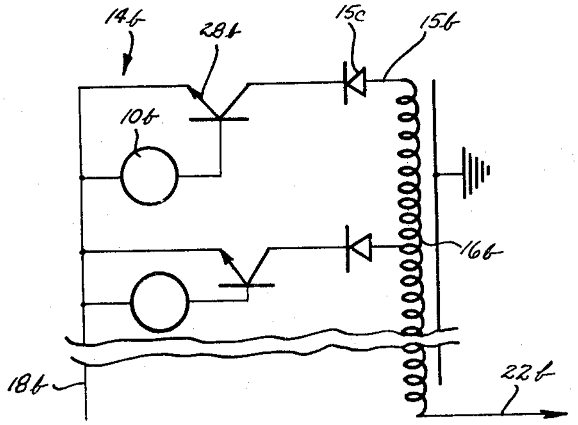

FIGURE 3*a* is a schematic view showing another modification.

In the development of character recognition machines, it has been found that moving a character area (FIGURES 1–1*d*) with respect to one or more rows 10 of stationary photocells is an excellent way of scanning. Although a light source and optical projection system are ordinarily required, to simplify this disclosure these conventional features are omitted.

FIGURES 1–1*d* show a scan system which now may be considered conventional, i.e., a dark character on a light area moving past a stationary row 10 of photocells producing a pulse when a photocell "sees" black and no pulse when it "sees" white. These figures also have graphs showing scan information output signals as they appear after conversion from parallel to serial configuration. At the position in FIGURE 1 all photocells see white and each photocell output is simultaneously available in parallel during time T1. After conversion by converter 12, the photocell output information is available as a serial signal G during times *t*1–*t*8 where the effect is that photocells 1–8 are read out sequentially during times *t*1–*t*8. FIGURES 1*a*–1*d* show the same procedure but at different times T2–T5 of the movement of the character with respect to photocells 10.

The converters 12 or 12*a* (FIGURES 2 and 2*a*) convert the information from the photocells to a serial output signal. Converter 12 is made of a group of coincidence devices or gates 14 connected by lines 15 to a parallel-to-serial memory device 16. One such device 16 is a delay line with a number of taps along its length, there being one coincidence device 14 connected with each tap. The output line 22 of delay line 16 has an amplifier 24 feeding buffer storage, a reading machine memory circuits 25, or the like.

Gates 14 are logical AND gates, each with two inputs. One input is the signal from one photocell and the other input is from conductor 18 connected with a pulse generator, diagrammatically represented as a strobe pulse generator 20. Each pulse P on conductor 18 interrogates all gates 14 simultaneously, and the outputs of all gates are simultaneously fed in parallel to the delay line 16. The pulse generator may be started and stopped by scan command signals, such as in Patent No. 3,104,369 of Rabinow et al. or in some other way.

Converter 12*a* (FIGURE 2*a*) is very similar to converter 12. Photocells 10*a* feed gates 14*a*. Upon interrogation by a signal on conductor 18*a* from signal generator 20*a*, gates 14*a* load a conventional shift register 16*a* in parallel by way of lines 15*a*. The nature of a delay line automatically makes available a serial output signal, but a shift register requires shift pulses for operation. Therefore, we have shown generator 20*a* feeding a ring counter through a delay. The ring counter provides the necessary (eight as shown) shift pulses for register 16*a* each time that gates 14*a* are simultaneously interrogated. Hence, the desired serial signal is available on line 22*a*, just as in the case of line 22 of converter 12.

One gate 14 is shown in detail in FIGURE 3. The particular gate configuration has advantages over conventional gates, such as providing a clean, square pulse, the equivalent of which would require several additional transistors in conventional circuitry. Further, the gate has a very high switch speed and functions as an amplifier as well as a quantizer.

Essentially, gate 14 is composed of one transistor 28 and a tunnel diode 30 e.g. a Texas Instruments Corp. 1N650, 1N651, 1N652 or 1N653. When used as a bistable device in conjunction with a photo-voltaic cell, as shown, it forms an excellent pulse gate. The circuit arrangement of FIGURE 3 is obvious from the diagram. In operation, the photocell PC is energized by "white" i.e. there is a photocell output when it fails to see any part of the character, and this produces an output which is fed to the base of transistor 28. The photocell output causes the transistor 28 to conduct, and the transistor functions as a low resistance element across diode 30 to ground. The low resistance path shunts sufficient current from a strobe pulse P passing through diode current load resistor 32 to ground, to prevent enough current from passing through the diode 30 to trigger the diode from its first (off) state to its second (on) state. Accordingly, there will be no output on line 15 to be fed to delay line 16 at the time that the strobe pulse interrogates the gate 14, because the low resistance characteristic of the diode in its first state shunts the pulse to ground.

On the other hand, if the photocell is not conductive i.e. the photocell sees black (FIGURE 1*c*), there is no input to the base of transistor 28 thereby turning it off. Consequently, the interrogation strobe pulse must pass through the diode 30 because the shunt path through the transistor 28 is at a high resistance, effectively removing this possible path for the interrogation pulse. The diode now receives enough current through resistor 32 to change to its second stable state which is less conductive than the first state. The higher effective resistance of a tunnel diode in its second stable state exhibits a sufficiently high resistance to permit the interrogation pulse P to appear at line 15 as a sharp pulse output of about one volt. Accordingly, the effect of the circuit is that the very small photocell output of the order of millivolts is a control for the larger signal of the diode.

The quantizing function of gate 14 is important since it is an economical way of having a digitalizing effect. The diode 30 is essentially on or off providing a digital "pulse or no pulse" output. However, there are other ways of obtaining the desired parallel to serial conversion without using gate 14.

For example, gate 14*b* (FIGURE 3*a*) may be selected when an analog system is contemplated. FIGURE 3*a* shows memory device 16*b* with parallel inputs 15*b* containing ordinary blocking diodes 15*c*. Each photocell 10*b* is connected between the base and emitter of a transistor 28*b*, while the collector is connected to one of the input lines 15*b*.

In operation, the interrogation signal on line 18*b* fed to the transistor emitter, appears at the collector where its amplitude is a function of the conductivity of transistor 28*b* between the emitter and collector. The conductivity is controlled by the voltage output of the photocell. Hence, the photocell-transistor combination serves to pass the interrogation pulse but with an amplitude as an analog function of the photocell output. In other words, if the photocell sees black the output of the memory device on line 22*b* will be an almost zero pulse (ideally zero); if the photocell sees gray the output pulse will be a small pulse; and if the photocell sees white the output pulse will be a large pulse. Of course, it is possible to quantize by additional circuitry at the output line 22*b*.

Summarizing the operation of the illustrated embodiments of our system, the photocells 10 or 10*a* are used to scan characters and provide a group of parallel outputs at each scan time, e.g. T1. These outputs are simultaneously gated with a pulse from a pulse generator or any other available source so that the effect is that the interrogation pulse functions as a scan trigger. The gates furnish outputs, still in parallel, to the memory device, e.g. taps of a delay line or a shift register, and the outputs are then available on lines 22 or 22*a* as a scan signal modulated with information in serial form.

Numerous modifications and changes may be made without departing from the principles of this invention. For example, the delay line 16 may easily be substituted by a known digital memory device other than a shift register. Although the scanner is stationary and the character movable, the scanner may be moved and the character held, or both may move so long as there is relative motion therebetween. We have shown eight photocells and eight gates in FIGURE 2, and this number may obviously be increased or decreased. The photocells are shown in a single row, and it is quite evident that these photocells may be interlaced or provided in any practical number of rows used either with or without interlace. FIGURES 1–1*d* disclose only five scan positions for a single character, and this number is ordinarily too small and should be increased in practice. Other modifications falling within the scope of the following claims may be resorted to without the departing from the protection thereof.

We claim:

1. In a system for scanning a character on an area moving in one direction wherein the scanner is a row of photocells providing a group of outputs in parallel, a parallel to serial converter comprising a plurality of gates, each gate having one input from one photocell of said scanner with all gates fed in parallel, a multiple input point memory device having its input points connected with the outputs of said gates, means providing a scan trigger signal as a simultaneous input to each one of said gates, and each gate which is satisfied by inputs from both its photocell and said scan trigger signal conducting an information signal to said memory device.

2. In a system for scanning a character on an area, a row of photocells to scan the character and provide a plurality of output signals in parallel, the improvement comprising means to provide scan trigger signals and convert the parallel signals to a serial output signal, said means including a parallel-loading multiple input memory device provided with a serial output line, a successive scan pulse conductor, a coincidence gate connected with said multiple input memory device at each input thereof, and each coincidence gate simultaneously fed by one photocell and by one pulse conducted by said successive pulse conductor to thereby load said device in parallel as a result of one scan pulse to make the parallel information available as a serial signal on said serial output line.

3. The system of claim 2 wherein said gates include transistor control diodes.

4. The system of claim 3 wherein said coincidence gates diodes are bistable with sharp cut off points in switching from one stable state to the other to thereby produce a quantizing function.

5. In a system for scanning an area, a scanner having a plurality of photocells providing a plurality of simultaneous outputs peculiar to the respective photocells, a coincidence gate fed by each photocell output, there being one gate for each photocell and all gates concurrently fed by the photocell outputs, means providing a trigger signal concurrently to all of said gates thereby simultaneously interrogating said gates, said gates having output lines, a multiple input parallel-to-serial memory device having said lines as respective inputs thereof thereby loading said memory device in parallel and making available an output of said memory device which is a serial signal having the parallel information which is fed to said memory device over said lines.

6. In a system for scanning an area, a scanner having a plurality of photocells providing a plurality of simultaneous outputs peculiar to the respective photocells, a coincidence gate fed by each photocell output, there being one gate for each photocell and all gates concurrently fed by the photocell outputs, means providing a trigger signal concurrently to said gates thereby simultaneously interrogating said gates, said gates having output lines, a multiple input parallel-to-serial memory device having said lines as respective inputs thereof thereby loading said memory device in parallel and making available an output of said memory device which is a serial signal having the parallel information which is fed to said memory device over said lines, each of said gates including a tunnel diode, and a transistor having a base and a collector and an emitter, said base being fed by the output of one photocell, said emitter and collector being connected with said trigger signal providing means and said memory device respectively, and said tunnel diode connected across said emitter and collector.

7. The system of claim 5 wherein said gates constitute amplifiers and quantizers, each gate including a transistor having a base and a collector and an emitter, said base fed by the output of one of said photocells so that said transistor conducts when a comparatively large signal is applied from the photocell to the transistor base and said transistor exhibits a high resistance when a comparatively small signal is applied from the photocell to the base of the transistor, said trigger signal providing means connected to said emitter, the trigger signal being greater than the highest signal from said photocell, a bistable diode, a network connecting said diode with said emitter and collector and to ground, said transistor providing a low resistance shunt path element across said diode to ground when photocell signal is comparatively high thereby shunting said trigger signal to ground through said transistor and leaving said diode in its first state, and said transistor being non-conductive when the photocell output is small thereby disconnecting said shunt path and requiring the trigger signal to actuate said diode to its second state which is less conductive than its first state whereby the diode in its second state provides a comparatively high resistance for said trigger signal so that it appears at the input of the diode as a digital signal.

8. In a circuit system which has a trigger signal conductor and a signal source where the trigger signal is greater than said source and the source varies within a given range, an amplifying and quantizing gate comprising a transistor having a base connected with said source, a collector to which said trigger signal conductor is connected, a bistable device having a greater resistance in its second state than in its first state, said bistable device connected with said collector and receiving said trigger signal, said device and the transistor emitter connected to ground so that the transistor is shunt-connected with said device, said transistor being conductive in response to a source signal in the higher part of said range thereby opening said shunt-connection with the device to shunt the trigger signal, and said transistor offering a high resistance when said source signal is in the lower part of said range so that said trigger signal actuates said device to its second stable state in which it exhibits a greater resistance as aforesaid so that said trigger signal is available as a sharp signal at the input of said of bistable device.

9. The subject matter of claim 8 wherein said bistable device is a tunnel diode, and said signal source is a photocell.

References Cited by the Examiner

UNITED STATES PATENTS

| | | | |
|---|---|---|---|
| 2,807,005 | 9/57 | Weidenhammer | 340—149 |
| 2,914,757 | 11/59 | Millership et al. | 340—173 |
| 2,932,006 | 4/60 | Glauberman | 340—149 |
| 2,979,702 | 4/61 | Zarcone et al. | 340—174 |
| 2,984,823 | 5/61 | Spencer | 340—173 |
| 3,003,121 | 10/61 | Hileman | 307—88.5 |
| 3,019,426 | 1/62 | Gilbert | 307—88.5 |
| 3,020,416 | 2/62 | Van Vechten et al. | 333—30 |
| 3,041,470 | 6/62 | Woodworth | 328—184 |
| 3,056,891 | 10/62 | Kabell | 307—88.5 |
| 3,066,229 | 11/62 | Cody | 307—88.5 |

MALCOLM A. MORRISON, *Primary Examiner.*

JOHN F. BURNS, *Examiner.*